(12) United States Patent
Finke et al.

(10) Patent No.: US 10,961,917 B2
(45) Date of Patent: Mar. 30, 2021

(54) TURBOMACHINE DUAL SPOOL TRANSMISSION SYSTEMS

(71) Applicant: Hamilton Sundstrand Corporation, Charlotte, NC (US)

(72) Inventors: Aaron M. Finke, Janesville, WI (US); Stephen Michael Bortoli, Roscoe, IL (US); Jonathan C. Dell, Elgin, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/536,938

(22) Filed: Aug. 9, 2019

(65) Prior Publication Data

US 2021/0040893 A1 Feb. 11, 2021

(51) Int. Cl.
*F16H 3/72* (2006.01)
*F02C 7/36* (2006.01)

(52) U.S. Cl.
CPC ............... *F02C 7/36* (2013.01); *F16H 3/72* (2013.01); *F05D 2260/40311* (2013.01); *F16H 2200/20* (2013.01)

(58) Field of Classification Search
None
See application file for complete search history.

(56) References Cited

U.S. PATENT DOCUMENTS

| | | | |
|---|---|---|---|
| 5,103,631 A * | 4/1992 | Edwards | F02C 3/107 60/39.163 |
| 7,168,913 B2 * | 1/2007 | Lardellier | F02C 7/32 415/122.1 |
| 7,788,898 B2 | 9/2010 | Kern et al. | |
| 7,973,422 B2 | 7/2011 | Colin et al. | |
| 8,734,281 B2 * | 5/2014 | Ai | B60K 6/365 475/5 |
| 9,347,373 B2 * | 5/2016 | Menheere | F16H 3/72 |
| 9,726,186 B2 | 8/2017 | Masson et al. | |
| 9,944,163 B2 * | 4/2018 | McKinzie | B60K 6/547 |
| 10,005,351 B1 * | 6/2018 | Lee | B60K 6/543 |
| 10,738,868 B2 * | 8/2020 | McKinzie | B60K 6/445 |

(Continued)

FOREIGN PATENT DOCUMENTS

| | | |
|---|---|---|
| DE | 19627407 A1 | 1/1998 |
| WO | 08044972 A1 | 4/2008 |

(Continued)

OTHER PUBLICATIONS

Extended European Search Report dated Jul. 17, 2020, issued during the prosecution of European Patent Application No. EP 19216084.4.

*Primary Examiner* — Dirk Wright (74) *Attorney, Agent, or Firm* — Locke Lord LLP; Daniel J. Fiorello; Scott D. Wofsy (57) ABSTRACT

A turbomachine dual spool transmission system can include a direct drive assembly configured to selectively allow bypassing of a dual spool differential combination output to allow selective direct engagement of a low pressure spool to directly drive a rotational member or to be directly driven by the rotational member. The system can include the dual spool differential. The dual spool differential can include a gear assembly configured to combine a low pressure spool input and a high pressure spool input into a combination output to provide an output speed range smaller than a low pressure speed range alone.

15 Claims, 7 Drawing Sheets

(56) References Cited

U.S. PATENT DOCUMENTS

| | | |
|---|---|---|
| 2013/0247539 A1 | 9/2013 | Hoppe |
| 2017/0248081 A1 | 8/2017 | Roach et al. |
| 2017/0328453 A1 | 11/2017 | McKinzie et al. |
| 2018/0149091 A1 | 5/2018 | Howell et al. |

FOREIGN PATENT DOCUMENTS

| | | |
|---|---|---|
| WO | WO-2008082336 A1 | 7/2008 |
| WO | WO-2015073084 A1 | 5/2015 |

* cited by examiner

TURBOMACHINE DUAL SPOOL TRANSMISSION SYSTEMS

FIELD

This disclosure relates to turbomachine transmissions, more specifically to dual spool transmission systems.

BACKGROUND

A desire by aircraft engine manufacturers to extract accessory power from the low pressure spool (LS) instead of the high pressure spool (HS) is hindered by the difference in optimum speed ratios between the accessories and LS and HS. Certain accessory speed ranges are approximately 2.2:1 (e.g., for a variable frequency generator that has a speed range of 360 Hz 800 Hz) while the LS speed range can be up to 10:1. Constant and/or variable frequency generators speed ranges are a result of speed conditioning capability and the output frequency range required by the aircraft. Further, the wide speed range of the LS has some drawbacks for power extraction, e.g., very high torque at low speed, and the need to condition the output speed for the accessories.

Certain proposed solutions may include large and complex multi-speed or variable-speed transmissions to condition the LS output speed. The size of such transmissions is driven by high torque at LS minimum speed. High torque at minimum speed is a result of constant power extraction requirements for accessories.

Such conventional methods and systems have generally been considered satisfactory for their intended purpose. However, there is still a need in the art for improved transmission systems. The present disclosure provides a solution for this need.

SUMMARY

A turbomachine dual spool transmission system can include a direct drive assembly configured to selectively allow bypassing of a dual spool differential combination output to allow selective direct engagement of a low pressure spool to directly drive a rotational member or to be directly driven by the rotational member. The system can include the dual spool differential. The dual spool differential can include a gear assembly configured to combine a low pressure spool input and a high pressure spool input into a combination output to provide an output speed range smaller than a low-spool speed range. The combination output can be connected to a first input of the direct drive assembly to drive the rotational member.

The dual spool differential can be any suitable dual spool differential, e.g., as disclosed herein. The gear assembly can include any suitable gear assembly, e.g., as disclosed herein.

In certain embodiments, the ring gear of the gear assembly can include one or more ring gear connections extending from and/or connected to the ring gear to rotate with or to be rotated by the ring gear. The direct drive assembly can include one or more direct drive connections connected to or meshed with to the one or more ring gear connections to move with the one or more ring gear connections.

In certain embodiments, each direct drive connection can be mounted to the rotational member by a respective clutch to selectively engage each direct drive connection to the rotational member. Any other suitable arrangement is contemplated herein (e.g., a clutch between one or more of the one or more ring gear connections and the ring gear).

In certain embodiments, the one or more ring gear connections include a first gear and a second gear, wherein the one or more direct drive connections include a third gear and a fourth gear. The first gear can be meshed with the third gear to provide a first gear ratio between the ring gear and the rotational member, and the second gear can be meshed with the fourth gear to provide a second gear ratio between the ring gear and the rotational member. In certain embodiments, the fourth gear can be larger than the third gear to provide a low speed gear ratio through the first and third gears, and a high speed gear ratio through the second and fourth gears.

The first input of the direct drive assembly can be mounted to the rotational member via an overrunning clutch such that the first input can rotate relative to the rotational member when the one or more direct drive connections are engaged by a respective clutch, and such that the combination output can drive first input when each clutch is disengaged. Any suitable one-way clutch or other suitable clutch mechanism is contemplated herein.

The system can include a transmission assembly having a transmission input connected to the rotational member of the direct drive assembly. The transmission can be connected in any other suitable manner. The transmission assembly can be configured to provide a first output gear ratio in a first state and a second output gear ratio in a second state.

The transmission assembly can include any suitable transmission assembly, e.g., as disclosed herein. The transmission input can be the transmission carrier or can be connected to the transmission carrier such that the rotational member of the direct drive assembly rotates the carrier of the transmission assembly. The transmission output can be the transmission ring gear or can be connected to the transmission ring gear.

In certain embodiments, the system can be configured to output a speed range of about 2.2:1 when being used in a direct drive mode such that a first low pressure spool speed range of 1466-3258 can be converted to an output speed range of 7200-16000 rpm and such that a second low pressure spool speed range of 4735-10416 can also be converted to the output speed range of 7200-16000 rpm. Any other suitable speed range(s) are contemplated herein.

In accordance with at least one aspect of this disclosure, a turbomachine can include a high pressure spool and a low pressure spool (e.g., any suitable multi-spool turbomachine as appreciated by those having ordinary skill in the art. A suitable multi-spool turbomachine may have two, three, or more spools. In accordance with this disclosure, the low pressure or high pressure spool may be an intermediate pressure spool in the specific engine application.). The turbomachine can include a dual spool differential, e.g., as disclosed herein (e.g., as described above), a direct drive assembly, e.g., as disclosed herein (e.g., as described above), connected to the dual spool differential, and a transmission assembly e.g., as disclosed herein (e.g., as described above), connected to the direct drive assembly at a transmission input to be driven by the combination output to turn a transmission output.

In accordance with at least one aspect of this disclosure, a method can include engaging a first clutch to directly drive a rotational member of a direct drive assembly and to bypass a combination output of a differential assembly to provide an output within a desired speed range at a low engine power setting. The method can include disengaging the first clutch and engaging a second clutch to directly drive the rotational member of the direct drive assembly and to bypass the combination output of a differential assembly to provide the output within the desired speed range at a high engine power setting. The method can include any other suitable method (s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 5 is a chart of low pressure spool power extraction as a function of both low pressure spool input speed (N1 speed) and high pressure spool input speed (N2 speed);

DETAILED DESCRIPTION

Figure 1:
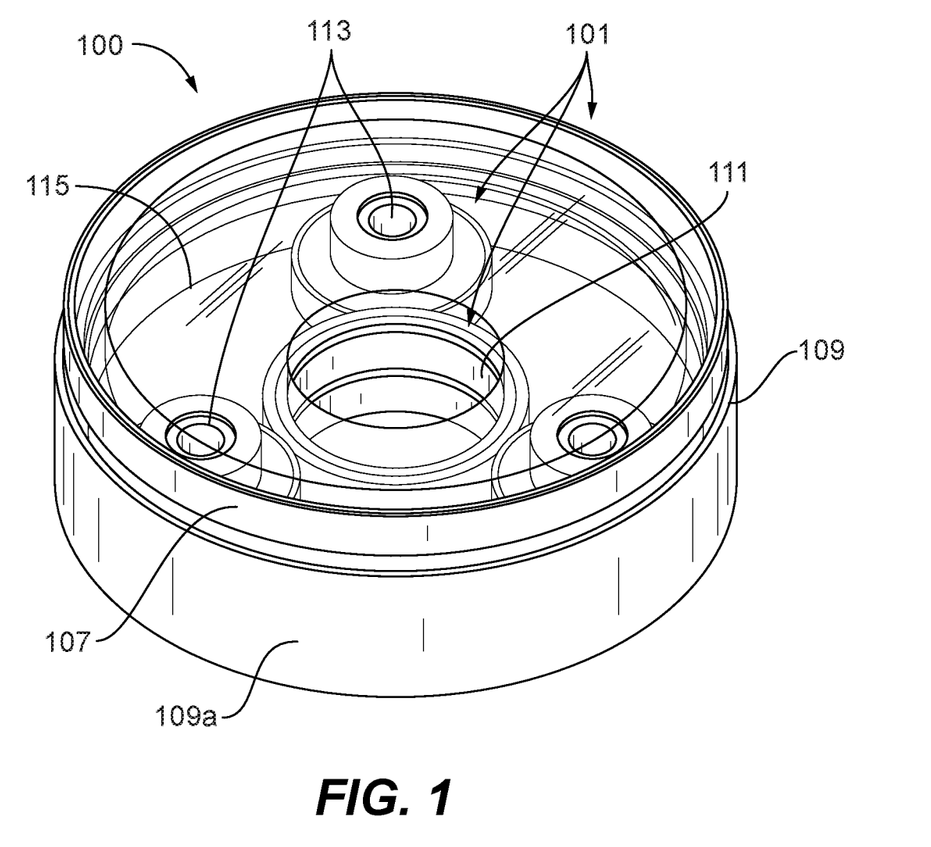
FIG. 1 is a perspective view of an embodiment of a differential in accordance with this disclosure.
Figure 2:
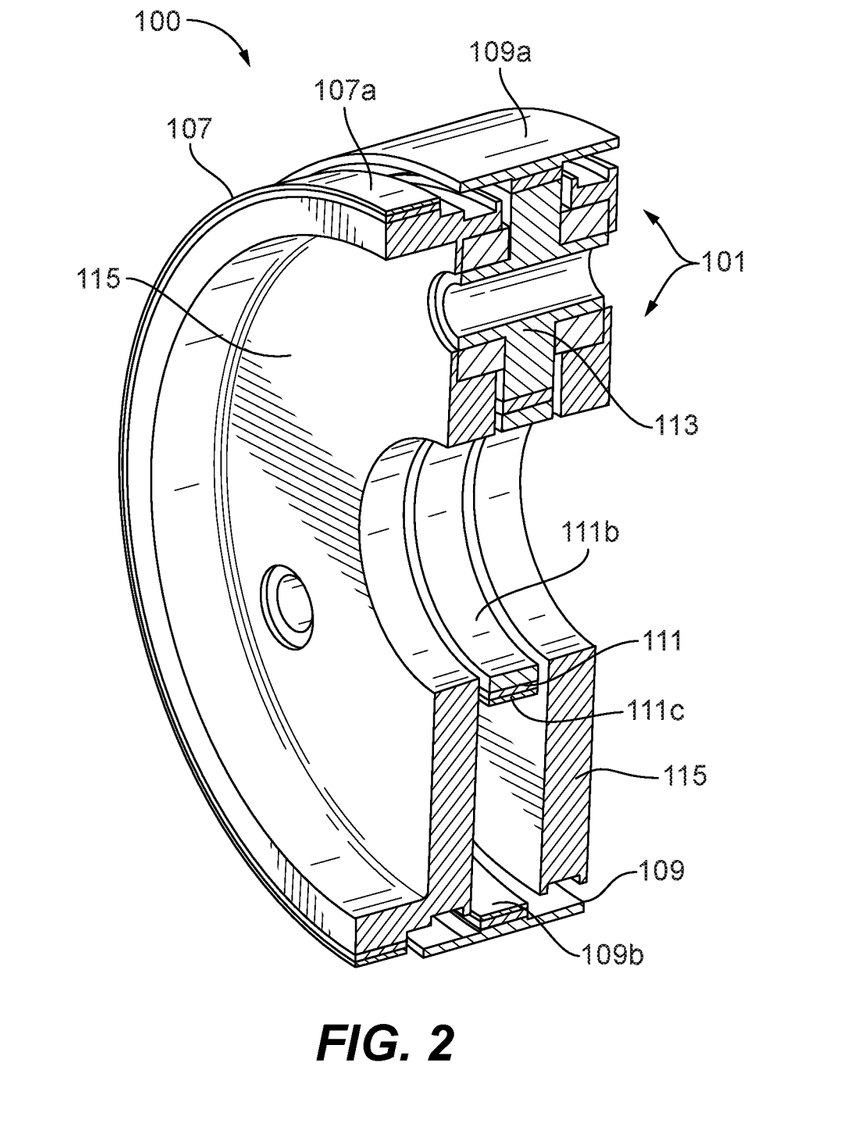
FIG. 2 is a perspective cross-sectional view of the embodiment of FIG. 1.
Figure 3:
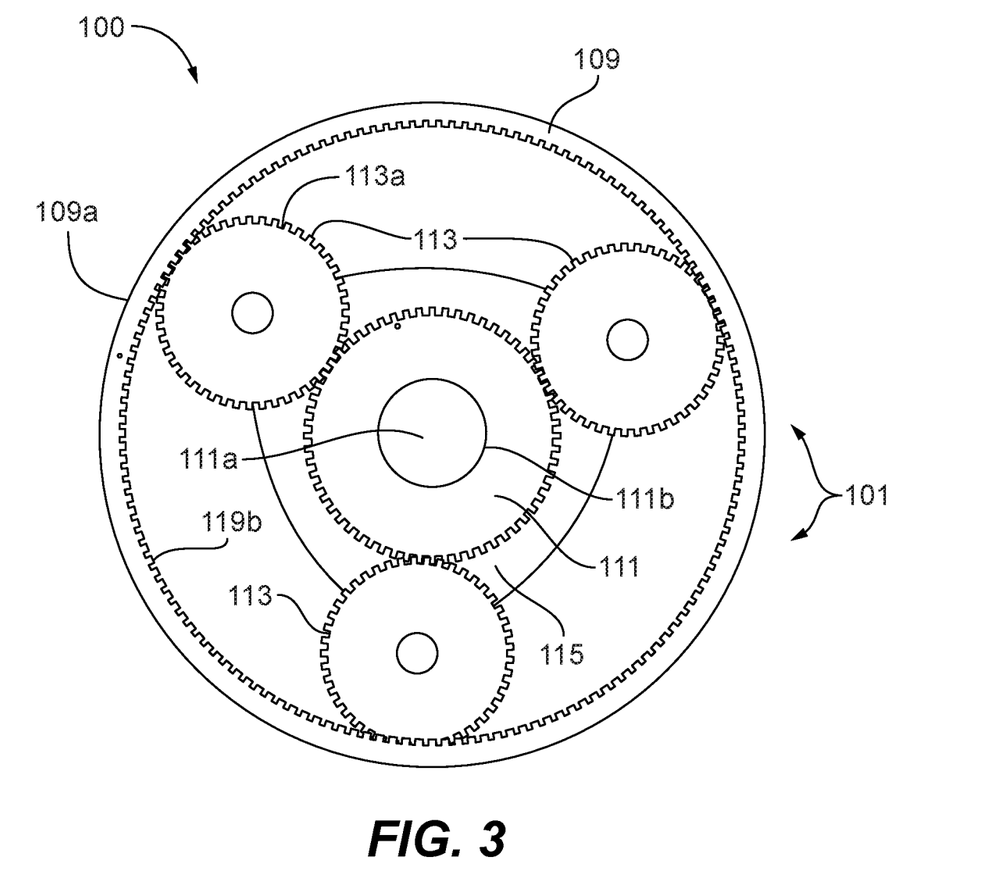
FIG. 3 is a plan view of the gear assembly of the embodiment of FIG. 1.

Reference will now be made to the drawings wherein like reference numerals identify similar structural features or aspects of the subject disclosure. For purposes of explanation and illustration, and not limitation, an illustrative view of an embodiment of a differential in accordance with the disclosure is shown in FIG. 1 and is designated generally by reference character 100. Other embodiments and/or aspects of this disclosure are shown in FIGS. 2-7.

Referring to FIGS. 1-4, a turbomachine dual spool differential 100 can include a gear assembly 101 configured to combine a low pressure spool input (e.g., input shaft 403) and a high pressure spool input (e.g., input shaft 405) into a combination output 107 to provide an output speed range (e.g., about 3:1 maximum) smaller than a low-spool speed range (e.g., about 10:1 maximum). In certain embodiments, the gear assembly 101 can include a ring gear 109, a sun gear 111, and a plurality of planetary gears 113 disposed between the sun gear 111 and the ring gear 109 and meshed with the sun gear 111 and the ring gear 109.

The planetary gears 113 can be rotationally connected to a carrier 115. The carrier 115 can include two sides, for example, e.g., as shown, that can be connected in any suitable manner (e.g., both sides bolted together) to trap the planetary gears 113.

In certain embodiments, the ring gear 109 can be configured to connect to the low pressure spool input 403 to rotate the ring gear 109 with the low pressure spool input 403, e.g., as shown. The ring gear 109 can include a spline or gear on an outer diameter 109a thereof, for example. Any suitable type of engagement and/or fastener to connect an input to the ring gear 109 is contemplated herein. The ring gear 109 can include gear teeth 109b on an inner diameter thereof meshed with gear teeth 113a of the planetary gears 113.

In certain embodiments, the sun gear 111 can be configured to be connected to the high pressure spool input 405 to rotate the sun gear 111, e.g., as shown. In certain embodiments, the sun gear 111 can include an inner opening 111a, e.g., defined through the sun gear 111. The sun gear 111 can include a spline 111b or a gear on an inner diameter thereof, for example. Any suitable type of engagement and/or fastener to connect an input to the sun gear 111 is contemplated herein. The sun gear 111 can include gear teeth 111c on an outer diameter thereof meshed with the gear teeth 113a of the planetary gears 113.

Figure 4:
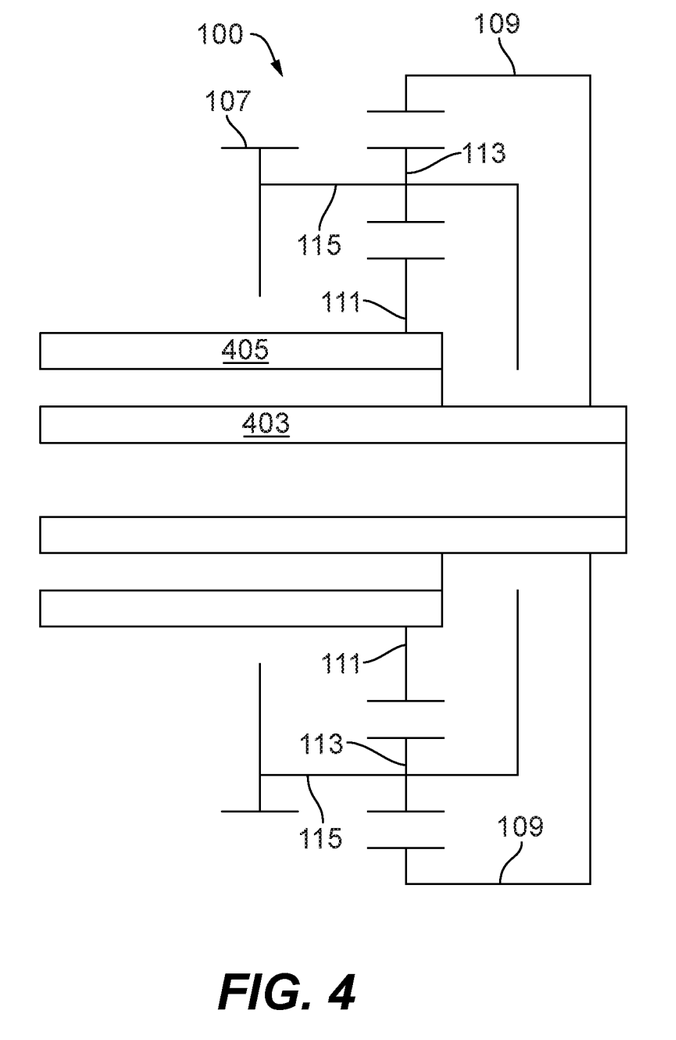
FIG. 4 is a schematic representation of the embodiment of FIG. 1, showing connected to a coaxial spool inputs.

As shown in FIG. 4, the input shafts (e.g., the high pressure spool and the low pressure spool) can be coaxial and in-line. In other embodiments, the high pressure spool and the low pressure spool can be separately positioned in any suitable manner (e.g., not coaxially). In certain embodiments, the spools can be separated and geared to the transmission, for example, which is connected to the differential 100.

The carrier 115 can be configured to connect to the combination output 107 to rotate the combination output 107 as a function of both of the low pressure spool input 403 and the high pressure spool input 405. In certain embodiments, the combination output 107 can be connected to or a part of the carrier 105. The carrier 105 can include a spline 107a or a gear on an outer diameter thereof that is the combination output 107 or is configured to connect to the combination output 107. For example, the carrier 105 can extend axially beyond the ring gear 109 and can include spline 107a, e.g., as shown.

In certain embodiments, the ring gear to sun gear ratio can be 2.5:1 such that the gear assembly 101 is configured to convert a 7.1:1 low pressure spool speed range and a 2.2:1 high pressure spool speed range to a 3.6:1 output speed range. Any other suitable gear ratio is contemplated herein. Any suitable output speed range is contemplated herein.

Figure 6:
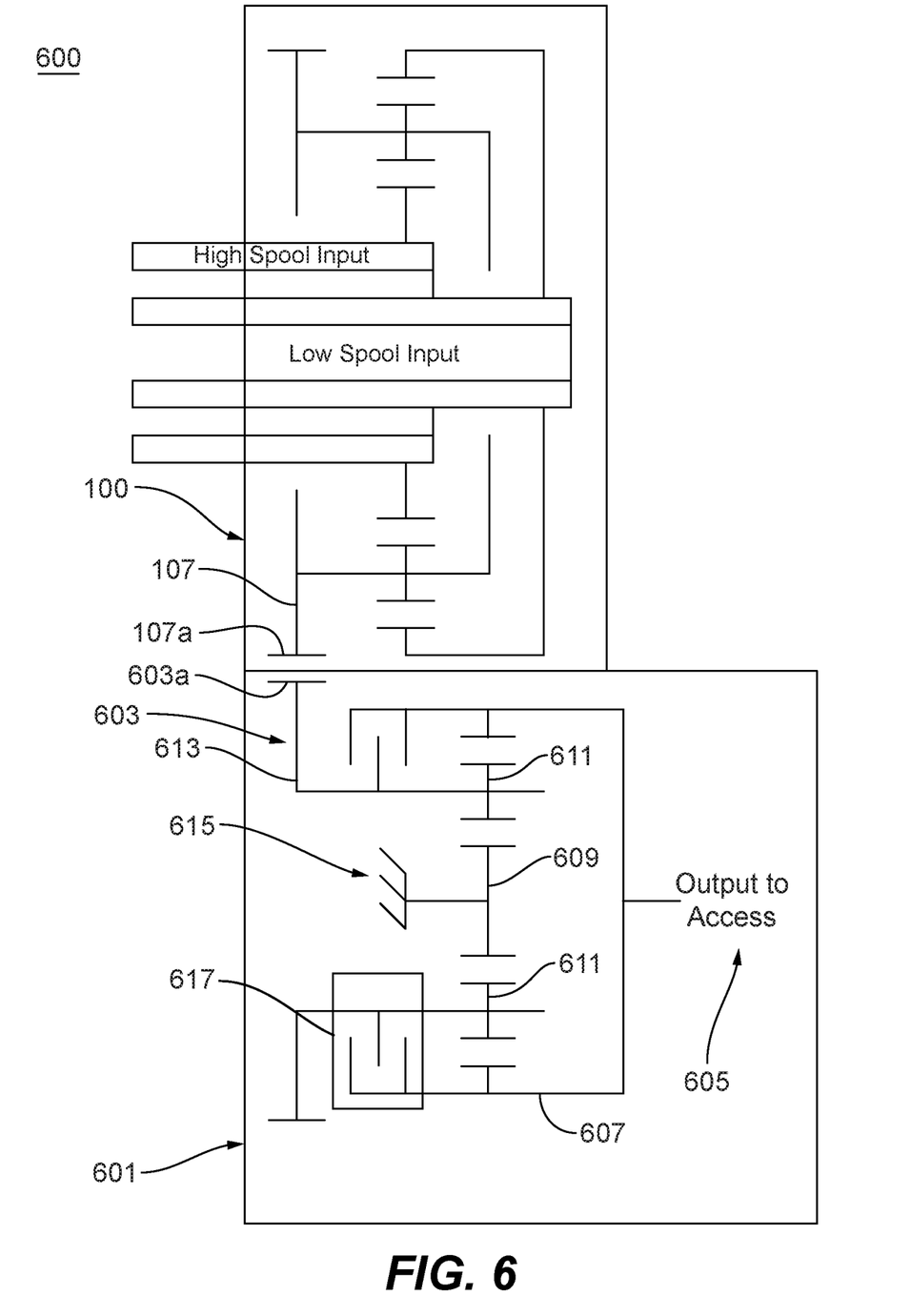
FIG. 6 is a schematic view of an embodiment of a transmission system in accordance with this disclosure.

Referring additionally to FIG. 6, a turbomachine dual spool transmission system 600 can include a transmission assembly 601 configured to connect to the combination output 107 of a dual spool differential 100 at a transmission input 603 to be driven by the combination output 107 to turn a transmission output 605. The transmission assembly 601 can be configured to provide a first output gear ratio in a first state and a second output gear ratio in a second state. As shown, the system 600 can include the dual spool differential 100, e.g., as described above.

The transmission assembly 600 can include a transmission ring gear 607, a transmission sun gear 609, and a plurality of transmission planetary gears 611 disposed between the transmission sun gear 609 and the transmission ring gear 607 and meshed with the transmission sun gear 609 and the transmission ring gear 607. The transmission planetary gears 611 can be rotationally connected to a transmission carrier 613. The gears 607, 609, and 611 can be meshed in any suitable manner as appreciated by those having ordinary skill in the art, e.g., as shown (e.g., similar to the gear assembly 101 of the differential 100).

The transmission input 603 can be the transmission carrier 613 or can be connected to the transmission carrier 613, for example (e.g., gear teeth disposed on an axial extension of the carrier 613 as shown). The transmission output 605 can be the transmission ring gear 607 or can be connected to the transmission ring gear 607. The transmission sun gear 609 can be grounded, e.g., to a ground 615 (e.g., an engine housing) such that the transmission sun gear 609 does not rotate.

The system 100 can include a clutch 617 configured to selectively engage the transmission carrier 613 and the transmission ring gear 607 together. For example, in the first state, the clutch 617 can be disengaged such that the transmission carrier 613 can rotate relative to the transmission ring gear 607 and such that the transmission ring gear 601 is rotated by the planetary gears 611 in accordance with the first gear ratio (the ratio defined by the relationship of gears 607, 609, and 611). For example, where the sun gear 609 is fixed, e.g., as shown, the carrier 613 will drive the planetary gears to rotate around the sun gear 609.

In the second state, the clutch 617 can be engaged such that the transmission carrier 613 is fixed to the transmission ring gear 607 and directly rotates the transmission ring gear 607 in accordance with the second gear ratio. For example, the transmission carrier 613 can include a transmission input gear 603a meshed with an output gear 107a of the combination output 107, the ratio of which can define the second gear ratio.

In accordance with at least one aspect of this disclosure, a turbomachine (not shown) can include a high pressure spool (e.g., spool input 405) and a low pressure spool (e.g., spool input 403). Any suitable multi-spool turbomachine is contemplated herein as appreciated by those having ordinary skill in the art. The turbomachine can include a turbomachine dual spool differential having a gear assembly as disclosed herein (e.g., 101 as described above) connected to the low pressure spool at a low pressure spool input and the high pressure spool at a high pressure spool input. The turbomachine can include a transmission assembly (e.g., 601) as disclosed herein (e.g., as described above) connected to the dual spool differential.

In accordance with at least one aspect of this disclosure, a method can include combining a low pressure spool input of a turbomachine and a high pressure spool turbomachine into a combination output to produce a reduced speed range relative to a low pressure spool speed range alone. The method can include maintaining an accessory speed range using a transmission connected to the combination output by selectively switching between a first state having a first gear ratio and a second state having a second gear ratio. The method can include any other suitable method(s) and/or portion(s) thereof.

As appreciated by those having ordinary skill in the art in accordance with this disclosure, in at least some embodiments of the differential 100, e.g., as shown, regardless of relative speed change between the high pressure spool and the low pressure spool, a smaller speed range than the low pressure spool speed range is always output. However, power extraction from each spool changes based on the absolute speed of the high pressure spool versus the low pressure spool as shown in the chart of FIG. 5.

The size of one or more of the gears of the gear assembly 101 can be changed to achieve a desired speed range and desired power extraction. Referring to FIG. 5, the typical speeds of the low pressure spool input speed (shown as N1 speed) and the high pressure spool input speed (shown as N2 speed) may be a diagonal line from the top left to the bottom right of the chart. However, any suitable speed possibilities for any suitable engine design are contemplated herein.

Power extraction can be shared between the high pressure spool and the low pressure spool, or not. As shown in the chart of FIG. 5, low pressure spool power extraction can be about 30% during taxi and/or descent speed settings, and about 55% during takeoff and/or climb and/or cruise speed settings. Embodiments can reduce the output speed range and increase the minimum output speed (e.g., from about 1466 rpm to about 3871 rpm in certain embodiments) to accessories by combining high pressure spool and low pressure spool input speeds to a single output speed. Certain embodiments can provide about 50% output speed range reduction (e.g., 7.1:1 low pressure spool speed range and 2.2:1 high pressure spool speed range converted to a 3.5:1 output speed range) and about a 38% torque reduction at minimum speed.

In certain embodiments, the speed range may still require reduction for certain accessories (e.g., less than 2:1). For example, if the low pressure spool speed range is still greater than a threshold, e.g., 5:1, then a transmission assembly (e.g., 601) may be used to achieve an even smaller speed range. Embodiments of a differential allow use of a simple transmission to further reduce the speed range (e.g., to about 2:1 or less).

As shown, in certain embodiments, the transmission carrier 613 is rotated by the carrier 115 of the differential 101. The transmission carrier 615 can be clutched to the transmission ring gear 607. Opening the clutch can provide a gear ratio (e.g., dependent on gear sizing/teeth of transmission gears) between differential 101 and transmission output 605, and closing the clutch can make the differential 101 provide power straight through to the transmission output 605 (e.g., a second gear ratio of 1:1 or any other suitable value).

Accordingly, embodiments can take a speed range from one or more embodiments of a dual spool differential and convert it to a speed range that is usable by certain aircraft engine accessories (e.g., a range of 2.2:1 or less, for example). For example, for an output range of 3.6:1 from the differential 101 (e.g., output speed range of about 3871 rpm to about 13756 rpm) and a 1.16:1 differential output gear ratio, and for a first transmission assembly gear ratio R1 of 1.6 (open clutch) and a second transmission assembly gear ratio R1 of 1.0 (closed clutch), the transmission output speed range can be controlled to about 7200 rpm to about 16000 rpm (about 2.2:1). As appreciated by those having ordinary skill in the art in view of this disclosure, ratios can be adjusted to meet required output speeds.

Figure 7:
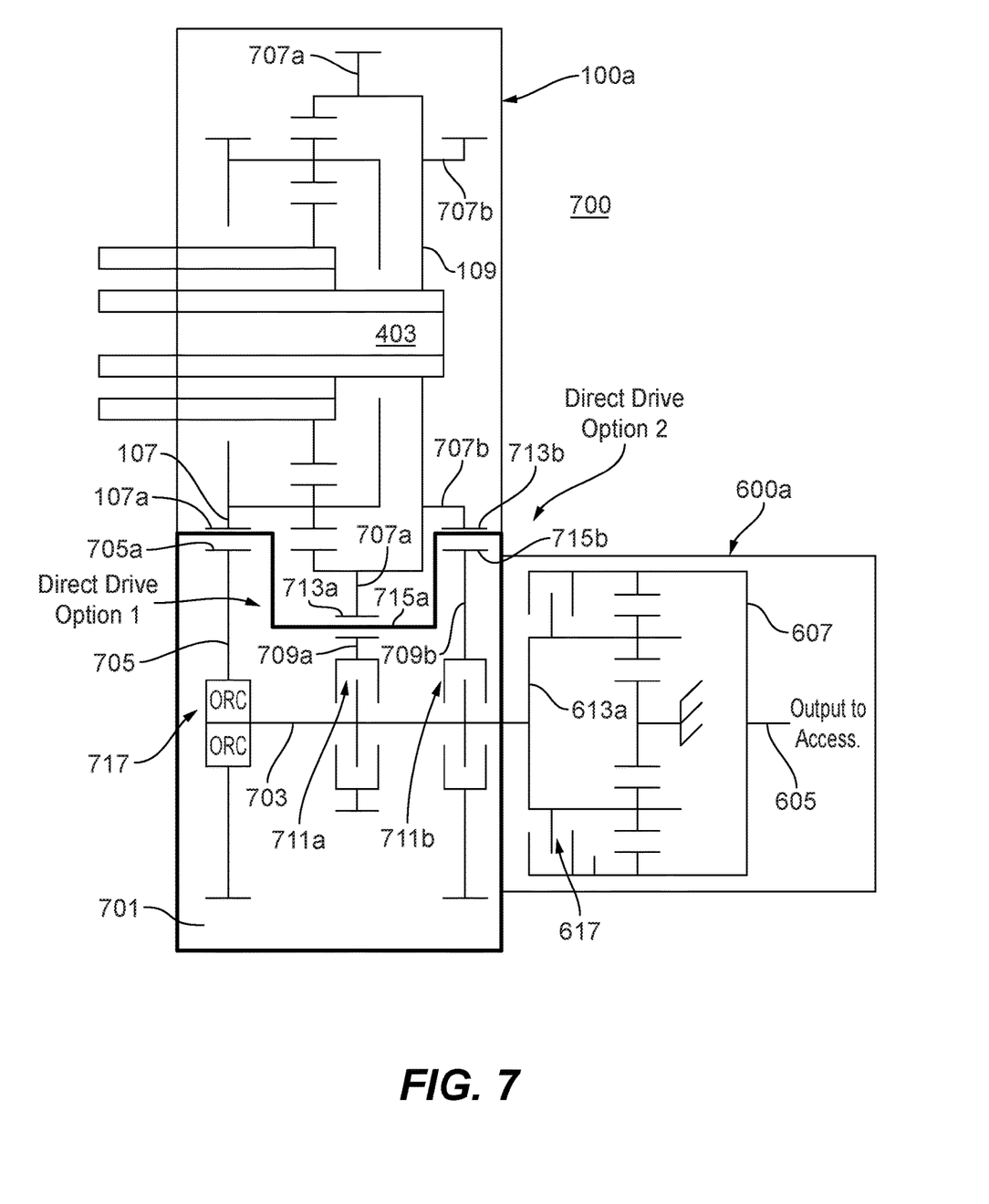
FIG. 7 is a schematic view of another embodiment of a transmission system in accordance with this disclosure.

Referring additionally to FIG. 7, a turbomachine dual spool transmission system 700 can include a direct drive assembly 701 configured to selectively allow bypassing of a dual spool differential combination output 107 to allow selective direct engagement of a low pressure spool (e.g., input shaft 403) to directly drive a rotational member (e.g., shaft 703, ring gear 109) or to be directly driven by the rotational member (e.g., shaft 703, ring gear 109). As shown, the rotational member can include shaft 703, however, any other suitable member (e.g., an output shaft, ring gear 109 attached to an output shaft) is contemplated herein.

The system 700 can include the dual spool differential 100a (e.g., differential 100 as disclosed above with any suitable modifications to allow direct bypass of one or more of the input shafts 403, 405, e.g., as shown for example). The dual spool differential 100a can be or include any suitable dual spool differential, e.g., as disclosed above.

The dual spool differential 100a can include a gear assembly, e.g., 101 as disclosed above configured to combine a low pressure spool input and a high pressure spool input into a combination output 107 to provide an output speed range smaller than a low spool speed range alone. The gear assembly can include any suitable gear assembly, e.g., as disclosed above.

The combination output 107 can be connected to a first input 705 of the direct drive assembly 700 to drive the rotational member (e.g., shaft 703). By this connection, in the embodiment shown, the rotational member (e.g., shaft 703) can be driven at the combination output speed which can be a smaller input speed range than the low pressure spool speed range, e.g., as disclosed above. The first input 705 can include a first input gear 705a meshed with the combination output gear 107a, and any suitable gear ratio therebetween is contemplated herein. Any other suitable connection is contemplated herein.

In certain embodiments, the ring gear 109 of the gear assembly 101 can include one or more ring gear connections 707a, 707b extending from and/or connected to the ring gear 109 to rotate with or to be rotated by the ring gear 109. The direct drive assembly 701 can include one or more direct drive connections 709a, 709b connected to or meshed with the one or more ring gear connections 707a, 707b to move with the one or more ring gear connections 707a, 707b.

In certain embodiments, each direct drive connection 709a, 709b can be mounted to the rotational member (e.g., shaft 703) by a respective clutch 711a, 711b to selectively engage each direct drive connection 709a, 709b to the rotational member (e.g., shaft 703 as shown). Any other suitable arrangement is contemplated herein. For example, additionally or alternatively to clutches 711a, 711b, a clutch can be used between one or more of the one or more ring gear connections 707a, 707b and the ring gear 109). Any suitable clutch mechanism is contemplated herein (e.g., a friction clutch).

In certain embodiments, the one or more ring gear connections 707a, 707b can include a first gear 713a and a second gear 713b. The one or more direct drive connections 709a, 709b can include a third gear 715a and a fourth gear 715b. The first gear 713a can be meshed with the third gear 715a to provide a first gear ratio between the ring gear 109 and the rotational member (e.g., the shaft 703). The second gear 713b can be meshed with the fourth gear 715b to provide a second gear ratio between the ring gear 709 and the rotational member 703. In certain embodiments, the fourth gear 715b can be larger than the third gear 715a to provide a low speed gear ratio through the first and third gears 713a, 715a, and a high speed gear ratio through the second and fourth gears 713b, 715b.

The first input 705 of the direct drive assembly 700 can be mounted to the rotational member (e.g., shaft 703) via an overrunning clutch 717 such that the first input 705 can rotate relative to the rotational member (e.g., shaft 703) when the one or more direct drive connections 709a, 709b are engaged by a respective clutch 711a, 711b, and such that the combination output 107 can drive first input 705 when each clutch 711a, 711b (e.g., both of clutches 711a, 711b) is disengaged. Any suitable one-way clutch or any other suitable clutch mechanism (e.g., a controllable friction clutch) is contemplated herein.

The system can include a transmission assembly 600a having a transmission input 613a connected to the rotational member (e.g., shaft 703) of the direct drive assembly 700. The transmission 600a can be connected in any other suitable manner (e.g., additionally or alternatively such that the transmission ring gear 607 is the rotational member and ring gear 109 can directly drive transmission ring gear 607 when engaged by a clutch). The transmission assembly 600a can be configured to provide a first output gear ratio in a first state and a second output gear ratio in a second state.

In certain embodiments, the transmission gear assembly 600a can be the same or similar to the transmission gear assembly 600 disclosed above. The transmission assembly 600a can include any suitable transmission assembly, e.g., as disclosed herein or otherwise. As shown, the transmission input 613a can be the transmission carrier or can be connected to the transmission carrier such that the rotational member (e.g., shaft 703) of the direct drive assembly 700 rotates the carrier of the transmission assembly 600a. In certain embodiments, the transmission output 605 can be the transmission ring gear 607 or can be connected to the transmission ring gear 607 in any suitable manner.

As shown, the transmission assembly 600a can include a transmission clutch 617, e.g., as disclosed above. The transmission clutch 617 can be configured to selectively engage the transmission input 613a, e.g., the carrier, as disclosed above.

Embodiments include several possible options to generate a desired output. For example, when all clutches 711a, 711b are disengaged, overrunning clutch 717 can engage causing the shaft 703 to be turned by the combination output 107. When one of the clutches 711a, 711b are engaged, the shaft 703 speed will cause the overrunning clutch 717 to disengage from the shaft 703 such that shaft 703 is disengaged from the combination output 107. When at least one clutch 711a, 711b is engaged, a low pressure spool (e.g., input shaft 403) can drive an output directly (e.g., either an output from the direct drive assembly 700 or an output of a transmission 600a connected to the direct drive assembly 700). Any suitable direct drive connection is contemplated herein.

In certain embodiments, the system 700 can be configured to output a speed range of about 2.2:1 when being used in a direct drive mode such that a first low pressure spool speed range of 1466-3258 (e.g., during idle, taxi, or descent) can be converted to an output speed range of 7200-16000 rpm (e.g., when the first clutch 711a is engaged). A second low pressure spool speed range of 4735-10416 (e.g., during takeoff, climb, or cruise) can also be converted to the output speed range of 7200-16000 rpm (e.g., when the second clutch 711b is engaged). Opening both clutches in the embodiment shown can result in a transitional zone between 3258-4725 rpm, for example, where the combination output drives the transmission which provides shared high pressure spool and low pressure spool power extraction, e.g., as shown in FIG. 5. Any other suitable speed range(s) are contemplated herein.

In accordance with at least one aspect of this disclosure, a turbomachine can include a high pressure spool and a low pressure spool (e.g., any suitable multi-spool turbomachine as appreciated by those having ordinary skill in the art). The turbomachine can include a dual spool differential, e.g., as disclosed herein (e.g., as described above), a direct drive assembly, e.g., as disclosed herein (e.g., as described above), connected to the dual spool differential, and a transmission assembly e.g., as disclosed herein (e.g., as described above), connected to the direct drive assembly at a transmission input to be driven by the combination output to turn a transmission output. Any other suitable arrangement is contemplated herein.

In accordance with at least one aspect of this disclosure, a method can include engaging a first clutch to directly drive a rotational member of a direct drive assembly and to bypass a combination output of a differential assembly to provide an output within a desired speed range at low engine speeds. The method can include disengaging the first clutch and engaging a second clutch to directly drive the rotational member of the direct drive assembly and to bypass the combination output of a differential assembly to provide the output within the desired speed range at high engine speeds. The method can include any other suitable method(s) and/or portion(s) thereof.

Any method and/or portion thereof can be embodied using any suitable computer software and/or hardware, and can be executed by any suitable controller. For example, a controller can be connected to each of the clutches to control a state thereof (e.g., engaged or disengaged), e.g., as a function of output speed to maintain speed within a desired speed range. The controller can control the direct drive assembly and/or transmission as a function aircraft flight phase (e.g., to utilize direct drive during low engine speeds such as taxi and descent).

Embodiments can include a dual spool differential used as an input to a small, lightweight and simple transmission to drive aircraft engine accessories, for example. The transmission input can be on the transmission carrier from the differential carrier. A grounded sun gear can provide a speed-trimming function to adjust the speed of the planet gears that are mounted in the carrier. The planet gears can mesh with the sun gear and ring gear which causes a rotation of the ring gear. The output of the transmission can be connected to the ring gear which drives the accessories, for example. A clutch between the carrier and ring gear can allow for straight-through operation. Embodiments allow for the output speed to be easily set by adjusting the gear ratios of the transmission, for example.

Certain embodiments include an epicyclic differential with high pressure spool and low pressure spool inputs that produces a smaller output speed range than the low pressure spool alone. The output of the differential can drive one or more aircraft and/or engine accessories (e.g., a generator). The output speed range ratio can be controlled by adjusting the differential parameters, for example.

Extracting power from the low pressure spool can allow for the high pressure spool to be made more efficient while also allowing for a lower idle speed which decreases brake wear. Embodiments can increase the minimum output speed which reduces the low speed torque. The reduced output speed range can simplify the size and configuration of a downstream transmission (e.g., a variable speed transmission) associated with the engine, for example. In certain embodiments, the downstream transmission can be eliminated entirely if the speed range is small enough, e.g., about 5:1.

Low spool power extraction can improve engine efficiency and stability, and can reduce brake wear during taxi. Embodiments can reduce maximum torque through the transmission as well.

Certain embodiments allow 100% low pressure spool power extraction during any and all stages of flight as desired. Embodiments can also allow for electric boost to the low pressure spool from an electric motor (e.g., connected to the direct drive assembly to drive the low pressure spool when directly engaged). For example, a motor/generator can be connected to transmission output and can drive the low pressure spool when directly engaged (e.g., and a controllable clutch for clutch 717 can be used instead of an overrunning clutch such that it can be disengaged when running the motor/generator). In certain embodiments, a first low speed direct drive feature connects the low spool to the accessory through a first gear mesh and first clutch, and a second high speed direct drive feature connects the low spool to the accessory through a second gear mesh and second clutch. One or more embodiments of a dual spool differential can still be utilized in certain embodiments for intermediate/transitional speeds where use of only the low pressure spool is outside of a desired speed range.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A turbomachine dual spool transmission system, comprising: a direct drive assembly configured to selectively allow bypassing of a dual spool differential combination output to allow selective direct engagement of a low pressure spool to directly drive a rotational member or to be directly driven by the rotational member;

further comprising the dual spool differential, wherein the dual spool differential includes a gear assembly configured to combine a low pressure spool input and a high pressure spool input into a combination output to provide an output speed range smaller than a low pressure speed range alone;

wherein the combination output is connected to a first input of the direct drive assembly to drive the rotational member;

wherein the gear assembly includes a ring gear, a sun gear, and a plurality of planetary gears disposed between the sun gear and the ring gear and meshed with the sun gear and the ring gear;

wherein the planetary gears are rotationally connected to a carrier; and wherein the ring gear is configured to connect to the low pressure spool input to rotate the ring gear with the low pressure spool input.

2. The system of claim 1, wherein the ring gear includes one or more ring gear connections extending from and/or connected to the ring gear to rotate with or to be rotated by the ring gear.

3. The system of claim 2, wherein the direct drive assembly includes one or more direct drive connections connected to or meshed with to the one or more ring gear connections to move with the one or more ring gear connections.

4. The system of claim 3, wherein each direct drive connection is mounted to the rotational member by a respective clutch to selectively engage each direct drive connection to the rotational member.

5. The system of claim 3, wherein the one or more ring gear connections include a first gear and a second gear, wherein the one or more direct drive connections include a third gear and a fourth gear, wherein the first gear is meshed with the third gear to provide a first gear ratio between the ring gear and the rotational member, and wherein the second gear is meshed with the fourth gear to provide a second gear ratio between the ring gear and the rotational member.

6. The system of claim 5, wherein the fourth gear is larger than the third gear to provide a low speed gear ratio through the first and third gears, and a high speed gear ratio through the second and fourth gears.

7. The system of claim 4, wherein the first input of the direct drive assembly is mounted to the rotational member via an overrunning clutch such that the first input can rotate relative to the rotational member when the one direct drive connections is engaged by a respective clutch, and such that the combination output can drive the first input when each clutch is disengaged.

8. A turbomachine dual spool transmission system, comprising: a direct drive assembly configured to selectively allow bypassing of a dual spool differential combination output to allow selective direct engagement of a low pressure spool to directly drive a rotational member or to be directly driven by the rotational member;

further comprising a transmission assembly having a transmission input connected to the rotational member of the direct drive assembly;

wherein the transmission assembly is configured to provide a first output gear ratio in a first state and a second output gear ratio in a second state;

wherein the transmission assembly includes a transmission ring gear, a transmission sun gear, and a plurality of transmission planetary gears disposed between the transmission sun gear and the transmission ring gear and meshed with the transmission sun gear and the transmission ring gear; and wherein the transmission planetary gears are rotationally connected to a transmission carrier.

9. The system of claim 8, wherein the transmission input is the transmission carrier or is connected to the transmission carrier such that the rotational member of the direct drive assembly rotates the carrier of the transmission assembly.

10. The system of claim 9, wherein the transmission output is the transmission ring gear or is connected to the transmission ring gear.

11. The system of claim 10, wherein the transmission sun gear is grounded such that the transmission sun gear does not rotate.

12. The system of claim 11, wherein the transmission assembly further includes a clutch configured to selectively engage the transmission carrier and the transmission ring gear.

13. The system of claim 12, wherein, in the first state, the clutch is disengaged such that the transmission carrier can rotate relative to the transmission ring gear, and such that the transmission ring gear is rotated by the planetary gears in accordance with the first output gear ratio, and wherein, in the second state, the clutch is engaged such that the transmission carrier is fixed to the transmission ring gear and directly rotates the transmission ring gear in accordance with the second gear ratio.

14. The system of claim 13, wherein the system is configured to output a speed range of about 2.2:1 when being used in a direct drive mode such that a first low pressure spool speed range of 1466-3258 can be converted to an output speed range of 7200-16000 rpm and such that a second low pressure spool speed range of 4735-10416 can also be converted to the output speed range of 7200-16000 rpm.

15. A turbomachine, comprising: a high pressure spool; a low pressure spool; and a dual spool differential comprising a gear assembly connected to the low pressure spool at a low pressure spool input and the high pressure spool at a high pressure spool input, the gear assembly configured to combine the low pressure spool input and the high pressure spool input into a combination output to provide an output speed range smaller than a low pressure speed range alone;

a direct drive assembly configured to selectively allow bypassing of the combination output to allow selective direct engagement of a low pressure spool to directly drive a rotational member or to be directly driven by the rotational member;

a transmission assembly connected to the direct drive assembly at a transmission input to be driven by the combination output to turn a transmission output, the transmission configured to provide a first output gear ratio in a first state and a second output gear ratio in a second state;

wherein the transmission assembly includes a transmission ring gear, a transmission sun gear, and a plurality of transmission planetary gears disposed between the transmission sun gear and the transmission ring gear and meshed with the transmission sun gear and the transmission ring gear; and wherein the transmission planetary gears are rotationally connected to a transmission carrier.

* * * * *